United States Patent [19]

Nakamizo et al.

[11] Patent Number: 4,695,795
[45] Date of Patent: Sep. 22, 1987

[54] ROTATION SENSOR WITH CO-PLANAR VELOCITY AND POSITION RESPONSIVE ELEMENTS

[75] Inventors: Hiromitsu Nakamizo, Tokyo; Takashi Mochida, Kanagawa, both of Japan

[73] Assignee: Sony Corporation, Tokyo, Japan

[21] Appl. No.: 684,590

[22] Filed: Dec. 21, 1984

[30] Foreign Application Priority Data

Dec. 28, 1983 [JP] Japan .................. 58-248923

[51] Int. Cl.$^4$ .................. G01P 3/48; G01B 7/30
[52] U.S. Cl. .................. 324/208; 324/174; 340/671; 340/870.31; 360/73; 360/84
[58] Field of Search .................. 324/160, 166, 167, 173, 324/174, 207, 208; 318/653, 318; 310/156, 168, 268, 68 R; 340/870.31, 870.32, 870.33, 870.34, 671, 672; 360/73, 84

[56] References Cited

U.S. PATENT DOCUMENTS

| 4,053,826 | 10/1977 | Wasawa et al. | 324/208 |
| 4,257,040 | 3/1981 | Shirasaki et al. | 340/870.31 X |
| 4,260,920 | 4/1981 | Nakamura | 310/156 |
| 4,322,757 | 3/1982 | Hatakeyama | 360/14 |
| 4,361,776 | 11/1982 | Hayashi | 310/268 |
| 4,410,853 | 10/1983 | Ikoma | 324/174 X |
| 4,529,934 | 7/1985 | Heinrich | 324/160 X |
| 4,599,561 | 7/1986 | Takahashi et al. | 324/208 |

FOREIGN PATENT DOCUMENTS

| 2614328 | 10/1976 | Fed. Rep. of Germany . | |
| 2840562 | 4/1979 | Fed. Rep. of Germany . | |
| 963595 | 7/1964 | United Kingdom | 324/208 |
| 2087565 | 5/1982 | United Kingdom . | |

Primary Examiner—Gerard R. Strecker
Attorney, Agent, or Firm—Vorys, Sater, Seymour and Pease

[57] ABSTRACT

A rotation sensor inlcudes circuitry for sensing both small units of rotation of a rotating body relative to a stationary body and a predetermined angular orientation of the former to the latter, and is designed to prevent electromagnetic interference between the rotation sensor circuitry (FG) and angular position sensor circuitry (PG). The FG circuit defines a full annular ring about the axis of the rotating body whereas the PG circuit covers a relatively narrow annular sector. The FG and PG circuits lie at different radial positions and do not overlap radially. Corresponding PG and FG magnetic rings fixed to the stationary body opposite the PG and FG circuits consist of annular sectors magnetized to alternating polarities. The symmetrical spacing of the FG magnetic sectors matches the angular spacing of FG circuit elements oriented perpendicular to the magnetic flux generated by adjoining magnetic sectors. The PG magnetic sectors match both the spacing and the total angular extent of the PG circuit. As the PG and FG circuits rotate, the corresponding magnetic sectors induce electric fields, resulting in the desired sensor signals. The PG and FG circuits are connected in parallel to a common electrical terminal. Connections from opposite ends of the FG circuit to the common terminal and to the FG output terminal may be curved so as to maximize their length in the magnetic flux region while minimizing their obliquity to the magnetic flux lines.

39 Claims, 18 Drawing Figures

ROTATION SENSOR WITH CO-PLANAR VELOCITY AND POSITION RESPONSIVE ELEMENTS

BACKGROUND OF THE INVENTION

The present invention relates generally to a rotation sensor which monitors the angular velocity of a rotating component, such as the rotary head of a video tape recorder and/or player. More particularly, the invention relates to a rotation sensor including a reference signal generator, which will be referred to hereafter as an "FG detector", producing a pulse for each unit of rotation of the rotary component and a position signal generator, which will be referred to hereafter as a "PG detector", producing a reference position indicative pulse at a predetermined reference position or positions of the rotary component relative to a stationary component.

In a motor driven rotary system such as the rotary head of a video tape recorder and/or player, which will be referred to hereafter as a "VTR head", it is necessary to control servo-monitors thereof to control angular velocity and phase synchronization. In the VTR head, angular velocity control is necessary for stability of head rotation and phase synchronization control is required to record the vertical hold control signal along one edge of the video tape. In order to perform both angular velocity control and phase synchronization control, a rotation sensor including a PG detector and a FG detector is employed in the servo system of the VTR head, which comprises a velocity control servo and a phase control servo.

FIGS. 1 and 2 show a typical conventional rotation sensor employing integral PG and FG detectors. FIG. 1 shows a stationary component comprising a printed conductor pattern 10 on a printed circuit board. FIG. 2 shows a rotary component comprising a magnetic ring 20, on the periphery of which are formed a plurality of blocks 22a, 22b, 24a and 24b of alternating N and S polarity. The printed circuit board serving as the stationary component is coaxially aligned with the magnetic ring 20 serving as the rotatable component with the printed conductor pattern 10 opposing the magnetic blocks 22a, 22b, 24a and 24b across a short gap. The printed conductor pattern 10 includes radially extending FG detector elements 13a. The angular pitch of each FG detector element 13a corresponds to a predetermined angle at which a reference signal $S_{FG}$ is to be produced, which is in the form of a sinusoidal wave as shown in FIG. 3. The FG detector elements 13a are connected to each other by outer peripheral elements 13b and inner peripheral elements 13c to form a complete FG detector circuit 13.

The angular width of magnetic blocks 22a and 22b corresponds to the angular pitch of the FG detector elements 13a. The magnetic blocks 22a and 22b cooperate with the FG detector elements 13a to act as a frequency generator outputting a sinusoidal reference signal pulse with each unit of rotation of the rotary component. This reference signal may be utilized for vertical hold control when the rotation sensor is employed in a VTR head servo system.

Each magnetic block 22a or 22b generates magnetic flux directed toward the adjacent magnetic blocks. The FG detector elements 13a cross the paths of the magnetic flux, which induces therein electric fields of a phase depending upon the instantaneous orientation of the magnetic flux. Therefore, as the magnetic ring 20 rotates, an alternating-current-type signal is induced in the FG detector 13. Since all of the FG detector elements 13a are connected to one another, the induced electricity is integrated over all of the elements and output as a single alternating-current-type signal via the FG output terminal 17 and a common terminal 16.

PG detector elements 14a also extend radially and have an angular pitch smaller than that of the FG detector elements 13a. Specifically, the pitch of the PG detector elements 14a is half that of the FG detector elements 13a. In addition, the phase of the PG detector elements 14a matches that of the FG detector elements. The magnetic blocks 24a and 24b respectively have the same angular spacing as the PG detector elements 14a. In the shown arrangement, the magnetic blocks 24a and 24b align with the PG detector elements once per cycle of rotation of the magnetic ring 20. The PG detector elements 14a cross magnetic flux paths formed between adjacent magnetic blocks 24a and 24b, 22a and 22b, and 24b and 22a, which induce electric fields interpreted as the position signal $S_{PG}$. The PG detector elements 14a are respectively connected to one another by means of outer and inner peripheral elements 14b and 14c, and connected to the FG detector elements 13 via one of the inner peripheral elements 13c. The PG detector elements 14a are also connected to PG output terminal 15 and the common terminal 16 so as to output the position signal $S_{PG}$ once in every cycle of magnetic ring rotation. The waveform of the position signal $S_{PG}$ is illustrated in FIG. 3.

As the PG detector elements 14a cross the magnetic flux lines between adjacent magnetic blocks 22a and 22b, an equal number of induced fields of opposite polarity are always induced in the PG detector elements 14a so that the integrated signal strength will be zero. For instance, when the PG detectors 14a are aligned with an adjoining pair of the magnetic blocks 22a and 22b, each adjoining pair of PG detector elements 14a is aligned with a single magnetic element so that the signal components in the detector elements 14a of each pair cancel. On the other hand, when adjoining PG detector elements 14a are aligned with adjoining magnetic blocks 24a and 24b, the elements 14a cross anti-parallel magnetic flux lines so that the electrical signal components reinforce each other, resulting in a position signal pulse. As a result, the electricity induced in the PG detector by rotation of the magnetic ring remains nil until the magnetic blocks 24a and 24b move into alignment with the PG detector elements 14a.

The position signals $S_{PG}$ may serve as a head position indicative signal when the rotation sensor is employed in a VTR servo system.

When the rotation sensor is used in a VTR head servo system, the position signal phase must sometimes be shifted through 1° or 2°. Of course, the required signal phase shift can be achieved by means of a phase converter in a control circuit of the VTR system. Usually, however, this signal phase shift is performed by displacing the PG detector elements by the desired angle relative to the FG detector elements. However, this displacement of the PG detector elements results in incomplete cancellation of the noise components in the reference signals $S_{FG}$ induced as the PG detector elements cross magnetic flux lines established by the magnetic blocks 24a and 24b. Consequently, the magnetic blocks 24a and 24b adversely influence the reference signal once per rotation due to the serial connection of the PG detector in the FG detector circuit. This influence is predominantly AM interference in the FM reference.

The interference caused by the aforementioned influence of the offset of the PG detector elements is illustrated in FIG. 4 in the form of the wave forms resulting when the $S_{FG}$ carrier signal is checked by a wow-flutter meter. In the waveforms illustrated in FIG. 4, the waveform A represents the results of shifting the PG detector elements through 2° with respect to the FG detector elements, the waveform B represents the results of shifting the PG detector element through 1° relative to the FG detector elements; and the waveform C shows a typical wow-flutter trace when the PG detector elements are not offset. Theoretically, there will be no influence on the $S_{FG}$ carrier frequency when the PG detector elements are not offset relative to the FG detector elements. Negligibly small fluctuations in the $S_{FG}$ wow-flutter trace of the carrier may occur due to slight offsets among the FG detector elements and the corresponding magnetic blocks. When the PG detector elements are shifted 1°, the noise in the $S_{FG}$ carrier can be observed immediately after production of the position signal pulse. This effect on the $S_{FG}$ carrier becomes even greater when the phase shift is 2°.

When such a conventional rotation sensor is employed in a VTR servo system, the aforementioned fluctuations in the $S_{FG}$ carrier frequency may adversely affect speed control. As is well known, feedback control is performed on the basis of deviations in the $S_{FG}$ carrier frequency relative to a reference frequency to control acceleration and deceleration of the servomotor. Therefore, fluctuations in the $S_{FG}$ carrier frequency due to the influence of the PG detector elements as described above cause matching fluctuations in the drive speed of the rotary head once per cycle of rotation. This causes "jitter" in the video signal, which degrades the reproduced image. In particular, servo systems in portable VTR sets have a relatively wide dynamic range in order to compensate for rolling and vibration of the set itself, and in such cases the influence of the PG detector element offset described above is much more serious.

Secondary interference in the $S_{FG}$ carrier frequency can be traced to the deviation between the electric fields induced by the PG magnetic blocks 24 in the radial conductors connecting the integrated FG detector elements to the common terminal 16 and the FG output terminal 17. Therefore, it appears that by avoiding the influence of the magnetic flux of the PG magnetic blocks 24 on these conductor lines, this noise component in the frequency signal can be eliminated.

SUMMARY OF THE INVENTION

In view of the aforementioned drawbacks in the conventional rotation sensor, it is an objective of the present invention to provide an improved rotation sensor which can reduce or eliminate the influence of PG magnetic blocks on the reference signal without any complicated circuitry.

Another object of the present invention is to provide a rotary head for a VTR system with a rotation sensor which allows precise feedback control and enables a speed control servo for the rotary head to drive the head readily and accurately.

In order to accomplish the aforementioned and other objects, a rotation sensor according to the present invention has its FG detector circuit and its PG detector circuit connected in parallel to a common terminal rather than in series, and preferably arranged to be offset so that their regions of revolution do not overlap. In further pursuit of this object, conductor lines for connecting an integrated conductor serving as part of a FG detector to its output terminal or terminals are disposed to be free from the electromagnetic influence of PG magnetic blocks built into or on a rotary component of the sensor.

In one approach, an integrated conductor serving as a PG detector is radially offset from the FG detector. The PG magnetic blocks on the rotary component are arranged to at least partially overlap the radially offset PG detector. This arrangement eliminates the influence of the PG magnetic blocks on the FG detector and thus successfully suppresses fluctuations in an FG carrier frequency which would otherwise occur at least once per cycle of rotation of the rotary element.

In another approach, the conductor line or lines connecting the FG detector to the FG output terminal or terminals are arranged so that at each point therealong they are oriented substantially parallel to the direction of magnetic flux from the PG magnetic blocks and the FG detecting magnetic blocks. This arrangement ensures that the conductor line or lines will never cross any of the magnetic flux lines generated by the rotary component. This eliminates any chance of electromagnetic interference between the PG detecting magnetic block and the FG detector or between the FG detecting magnetic block and the PG detector.

According to the invention, the rotation sensor comprises a rotary magnetic component subdivided into a plurality of speed detector magnetic blocks for detecting the rotation speed of the rotary magnetic component and a stationary printed circuit board opposing the speed detector magnetic blocks. The printed circuit board has a plurality of speed detecting conductor elements spaced at angular intervals corresponding to the angular extent of the speed detector magnetic blocks. One or more position detector magnetic blocks are also provided on the rotary magnetic component. The position detector magnetic blocks are located at a position which is radially offset from the speed detector magnetic blocks along the periphery of the rotary magnetic component. The printed circuit board has another set of position detecting conductors opposing the position detector magnetic blocks. The position detecting conductors are connected to output terminals through connector lines. The connector lines are approximately parallel throughout their length to the magnetic flux lines generated by the speed and position detector magnetic blocks.

Preferably, the connector lines on the printed circuit board lie outside of the magnetic field generated by the aforementioned magnetic blocks.

According to one aspect to the invention, a rotation sensor comprises a first rotary component including a magnetic element having a plurality of first segments arranged about the periphery of the rotary component and generating magnetic fields between each adjacent pair of such first segments, and one or more second segments disposed near the first segments and representing a reference angular position of the rotating object, the magnetic element being coupled with a rotating object the angular motion of which is to be monitored, for rotation therewith, and a second stationary component on which a first signal generator cooperative with the first segments of the magnetic element to output a first signal representative of angular motion of the rotating object, and a second signal generator cooperative with the second segments of the magnetic element to output a second signal indicative of the presence of the rotating component in the reference position, the first signal generator being connected to its output terminals via communication lines arranged to avoid electromagnetic interaction with the magnetic field formed by the second segments of the magnetic element.

According to another aspect of the invention, a rotation sensor comprises a rotation sensor for sensing angular speed and angular position of a rotating object, including a rotary magnet rotatable with the rotating object and a stationary printed circuit board opposing the rotary magnet, characterised in that the rotary magnet is provided with a plurality of symmetrically arranged first sectors magnetized to alternating polarities, and a plurality of second sectors of alternating polarity arranged on the rotary magnet at a reference position and having a different angular spacing than the first sectors, and the printed circuit board has a plurality of velocity sensing conductors radially symmetrically arranged at a pitch corresponding to the angular spacing of the first sectors, a plurality of regularly angularly spaced reference position detecting conductors at a position corresponding to the reference position of the rotating object and radially offset from the angular velocity sensing conductors with a different angular spacing than the velocity sensing conductors, the velocity sensing conductors all being connected in series to form an integral line connected to signal output lines at both ends thereof, the signal outputting lines extending oblique to the radii of the velocity sensing conductors.

According to another aspect of the invention, a rotation sensor comprises a magnetic element having a number of first symmetrical circular sectors, adjoining first sectors being magnetized in opposite polarities, and a smaller number of second circular sectors magnetized alternatingly in opposite polarities, the angular width of the first sectors being an integral product of the angular width of the second sectors, an FG detector having a number of conductors connected in series between a first terminal and an FG output terminal and susceptible to electromagnetic induction by the first sectors, a PG detector having a number of conductors connected in series between the first terminal and a PG output terminal in parallel with the FG detector and susceptible to electromagnetic induction by the second sectors, the magnetic element being secured to a rotatable body opposite the detectors.

It is also an object of the present invention to provide a rotary magnetic head drive for a video tape recorder with precise speed and phase control with a noise-free rotation detector.

The rotary head employs the rotation sensor constructed as described above. The rotation sensor produces a head position signal and reference signal for performing precise speed control and phase control while avoiding mutual influence between the speed detecting components and the position detecting components.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiments but are for explanation and understanding only.

In the drawings.

DESCRIPTION OF THE PREFERRED EMBODIMENT

Figure 1:
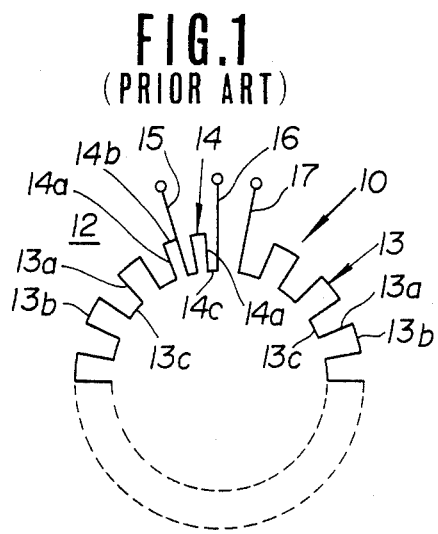
FIG. 1 shows a printed circuit pattern for PG and FG detectors on a printed circuit board serving as a stationary component of a conventional rotation sensor.

Referring now to the drawings, FIGS. 5 through 8 illustrate the structure of a rotary head 30 for a video tape recorder employing the preferred embodiment of rotation sensor 200 according to the present invention. Although a specific application of the rotation sensor 200 is disclosed in order to show in detail one mode of application of the rotation sensor according to the invention, it should be understood that the rotation sensor of the invention is not limited to this application. The rotation sensor according to the invention should be recognized to be applicable to any systems which require a signal or pulse per unit of rotation of a rotating object to indicate the rotation speed or angular velocity of a rotating object as well as at a given angular position of the rotating object.

Figure 5:
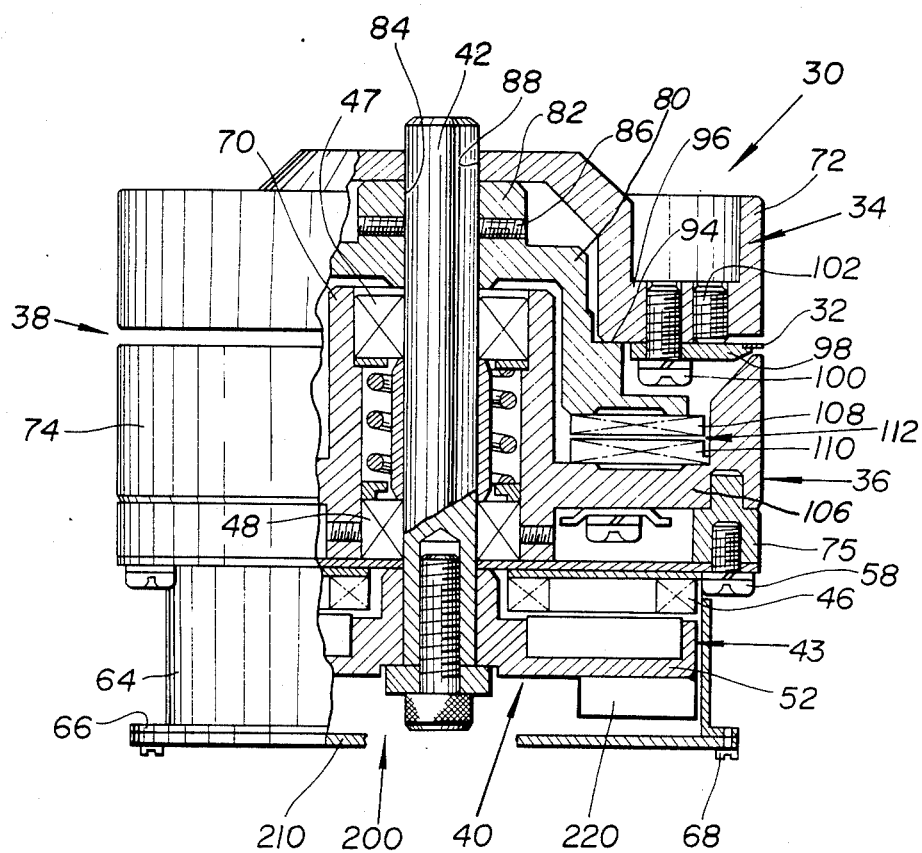
FIG. 5 is a partially sectioned front elevation of a rotary head for a video tape recorder employing the preferred embodiment of a rotation sensor according to the present invention.
Figure 6:
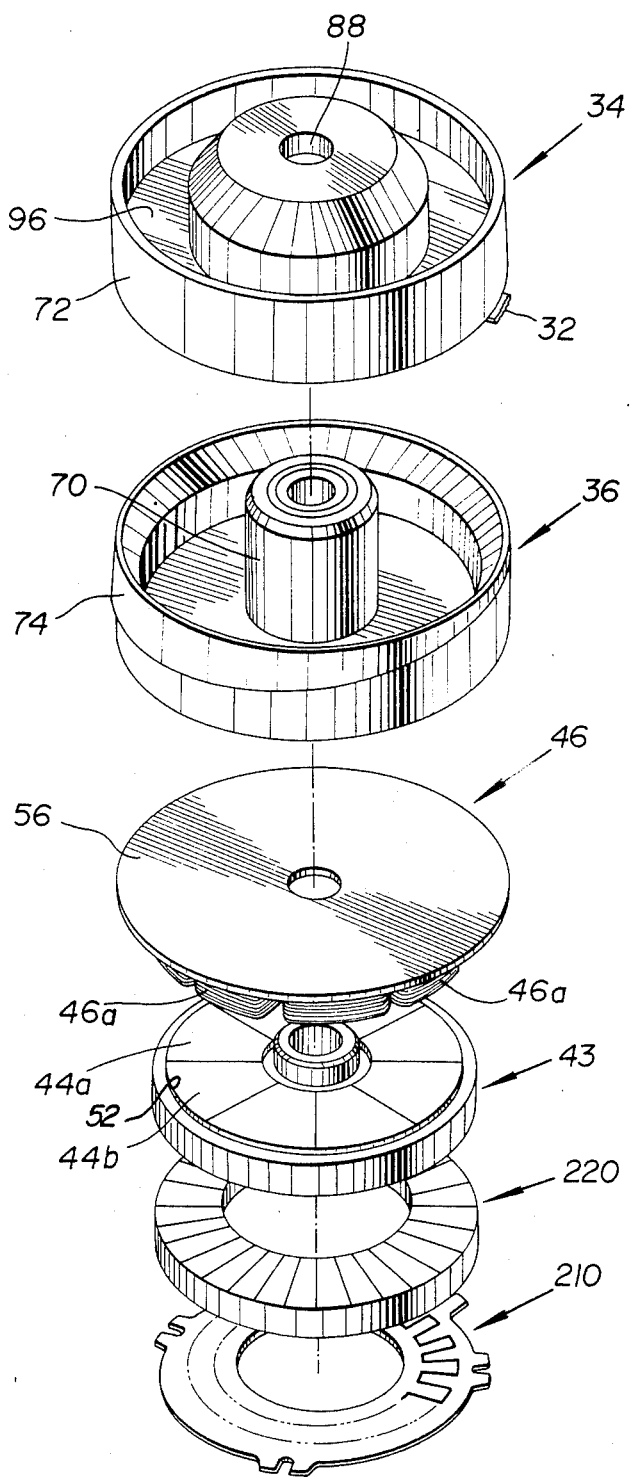
FIG. 6 is an exploded view of a rotary head employing the preferred embodiment of the rotation sensor of the invention.
Figure 7:
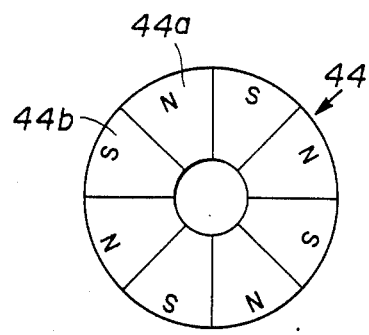
FIG. 7 is a plan view of a rotor of a brushless motor employed in the rotary head of FIGS. 5 and 6.
Figure 8:
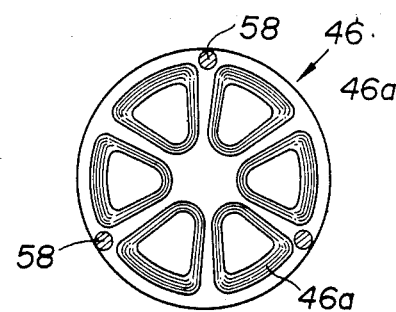
FIG. 8 is a plan view of a coil assembly of the brushless motor, which is coupled to the rotor of FIG. 7.

The VTR head shown in FIGS. 5 and 6 generally comprises a guide drum assembly 38 including an upper rotary drum 34 and a lower stationary drum 36, a brushless motor 40 housed in a motor housing 64, and the rotation sensor 200. The guide drum assembly 38 is adapted to drive a magnetic tape (VTR tape) over one or more magnetic head elements 32.

The rotary drum 34 is coupled to a drum support 80 having an inner cylindrical section 82. Both the rotary drum 34 and the drum support 80 have central through openings 88 and 84 through which a drive shaft 42 of the brushless motor 40 extends. The inner cylindrical section 82 of the drum support 80 is secured to the drive shaft 42 by means of a fastener 86. The drum support 80 also has an annular stepped section 94 on which the lower surface of a connecting section 96 of the rotary drum 34 rests. The vertical positioning of the lower edge of the rotary drum 34 relative to the upper edge of the stationary drum 36 is thus defined so as to define a predetermined vertical clearance therebetween sufficient to receive magnetic heads 32 with adequate clearance.

The rotary drum 34 is fixedly secured to the drive shaft 42 for rotation therewith. On the other hand, one or more head support plates 98, each of which supports a magnetic head element 32 at its outer end, are secured by means of fastener screws 100 to the connecting section 96. Therefore, the magnetic head elements 32 are secured to the rotary drum 34 to rotate with the latter. The magnetic head elements 32 are thus driven by the brushless motor 40 via the drive shaft 42 with the rotary drum 34. The magnetic head elements 32 supported by the head support plates 98 extend slightly beyond the outer periphery of the guide drum assembly 38 so that they may slidingly contact the VTR tape surface. The upper surface of each head support plate 98 opposes a head height adjuster 102. In the shown embodiment, the adjuster 102 comprises an adjuster screw threaded to the connecting section 96 of the rotary drum 34. Turning the adjuster 102 adjusts the extent to which the lower end of the adjuster 102 projects below the lower surface of the connecting section 96. The lower end of the adjuster 102 abuts the upper surface of the head support plate 98 so that by turning the adjuster 102, the height of the magnetic element 32 can be adjusted. This aids precise and accurate adjustment of the height of the magnetic head elements upon assembling.

The stationary drum 36 has an inner cylindrical section 70, the inner periphery of which retains two rotary bearings 47 and 48. The drive shaft 42 extends coaxially through the bearings 47 and 48 and is thereby rotatably supported by the bearings. The stationary drum 36 also has an outer cylindrical section 74 (FIG. 6), the outer periphery of which lies flush with the outer periphery of the outer cylindrical section 72 of the rotary drum 34. An annular spacer ring 75 is secured to the outer edge of the lower surface of the outer cylindrical section 74 by means of tongue-and-groove engagement and extends downwardly therefrom. The lower surface of the spacer ring 75 lies approximately flush with the lower surface of the inner cylindrical section 70. The outer periphery of the spacer ring 75 also lies flush with the outer periphery of the outer cylindrical section 74. A disc section 106 connects the inner and outer cylindrical sections 70 and 74. The upper surface of the disc section 106 opposes the lower surface of the drum support 80.

An upper magnetic core 108 is mounted on the lower end surface of the drum support 80, which magnetic core 108 comprises a magnetic material, such as a ferrite about which a conductive coil is wound. A lower magnetic core 110 is mounted on the upper surface of the disc section 106 adjacent the upper magnetic core 108. Similarly to the upper magnetic core 108, the lower magnetic core comprises a magnetic material, such as ferrite wrapped in a conductive coil. The magnetic coils and the magnetic cores 108 and 110 are coupled so as to form a rotary transformer 112. The coupled coil of the upper magnetic core 108 rotates with the drum support 80. The coupled coil of the lower magnetic core 110 is fixed to the stationary drum 36.

The brushless motor 40 drives the rotary drum 34, the magnetic head elements 32 and the drum support 80 to rotate. The motor 40 generally comprises a magnetic rotor 43 and eight magnetic rotor elements 44, shown in FIG. 7, mounted on the upper surface of the rotor 43. Adjacent magnetic rotor elements 44 are of opposite magnetic polarity. In other words, the upper surface of the magnetic rotor 43 is divided symmetrically into a number of sectors of alternating polarity. Each magnetic rotor element 44 is fixedly received within a recess formed in a rotary disc 52 making up most of the magnetic rotor 43. The magnetic rotor 43 opposes a stator coil assembly 46 shown in FIG. 8.

The stator coil assembly 46 comprises a conductive mounting plate 56 which is made of a electrically conductive material, and six coil elements 46a secured to the surface of the mounting plate facing the magnetic rotor elements 44. The stator coil assembly 46 is secured to the lower surface of the stationary drum 36 by means of fastener screws 58.

This brushless motor construction is illustrated in U.S. Pat. No. 4,361,776, issued on Nov. 30, 1982, to Hayashi et al. The contents of the above-identified U.S. Patent are hereby incorporated by reference for the sake of disclosure.

A magnetic ring 220 of the rotation sensor 200 is fixedly mounted on the lower surface of the rotary disc 52 of the brushless motor 40 for rotation therewith. The stator coil assembly 46 and the magnetic rotor 43 are housed in a motor housing 64 which is secured to the lower surface of the stationary drum 36. The motor housing 64 has a flange 66 extending transversely from the outer edge of its lower surface. A printed circuit board 210 of the rotation sensor 200 is secured to the lower surface of the motor housing 64 by means of fastening screws 68 threaded into the flange 66. The PG and FG conductor patterns are printed on the upper surface of the printed circuit board opposing the magnetic ring 220.

In the preferred embodiments, the printed circuit board 210 comprises a board made of a silicon steel plate and PG and FG conductors deposited on the board over an insulating layer. With this construction, the board itself defines a magnetic flux path to enhance the sensitivity of the rotation sensor. The PG and FG conductors are formed on the printed board by well-known photo-etching processes.

Figure 9:
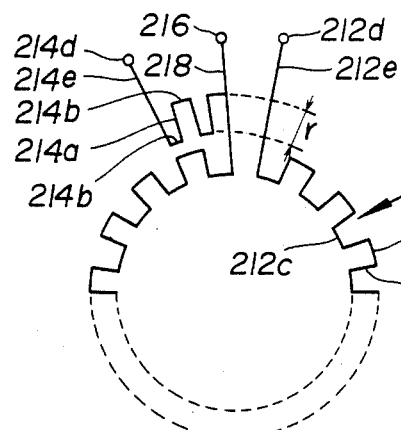
FIGS. 9 and 10 show conductor patterns on a printed circuit board according to preferred embodiments of the invention.
Figure 10:
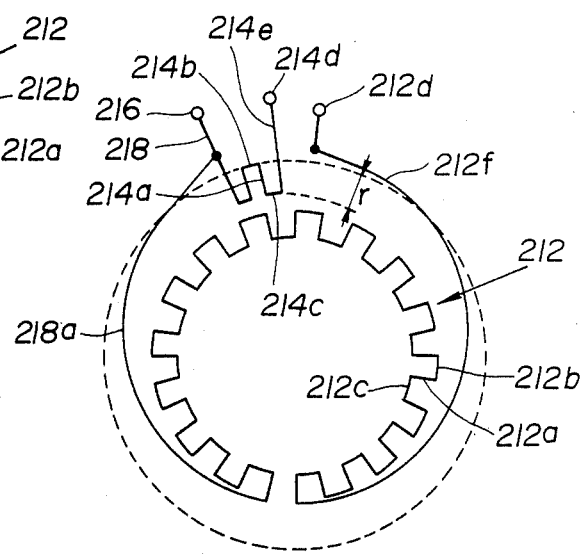

FIGS. 9 and 10 show PG and FG conductor patterns printed on the conductive printed circuit board 210, which printed patterns are illustrated in the same manner as in FIG. 1. Similarly to the conventional printed pattern shown in FIG. 1, the printed conductor pattern of FIG. 9 includes an FG detector 212 which produces the reference signal with a frequency directly proportional to the angular velocity of the magnetic rotor 43 of the brushless motor and thus indicative of the angular velocity of the magnetic head elements 32 rotating with the rotary drum 34. The FG detector 212 has a plurality of FG detector elements 212a extending radially and arranged radially symmetrically at a predetermined constant pitch, i.e. at predetermined angles, e.g. 4°. The FG detector elements 212a are connected to each other by outer and inner peripheral conductive components 212b and 212c to form an integral FG circuit pattern. The FG detector 212 formed as set forth above is connected to a FG output terminal 212d via a connector line 212e and to a common terminal 216 via a common line 218. In the embodiment of FIG. 9, the connector line 212e and the common line 218 extend precisely radially.

The PG detector 214 is connected in parallel to the common terminal 216 and is radially offset from the FG detector 212 to the extent that the two detectors 212, 214 do not overlap. Also, the phase of the PG detector 214 is shifted relative to the FO detector 212 by a given angle, e.g. 2°. The PG detector 214 has radial PG detector elements 214a similar to the FG detector 212. The radial elements 214a extend through radial region r. The PG detector elements 214a are connected to each other by outer and inner conductive circumferential components 214b and 214c. The PG detector 214 is connected to a PG output terminal 214d via a connector line 214e. The other end of the PG detector 214 is connected to the common line 218 and is thereby connected to the common terminal 216. The PG detector elements 214a are spaced at angles different from that of the FG detector elements 212a. In the shown embodiment, the pitch of the PG detector elements 214a is selected to be exactly half the pitch of the FG detector elements 212a i.e. 2°.

The PG detector 214 is located at an angular position corresponding to the reference position of the magnetic head elements 32 so that it produces a position signal indicative of the reference position of the magnetic head elements 32 and the rotary drum 34.

Figure 2:
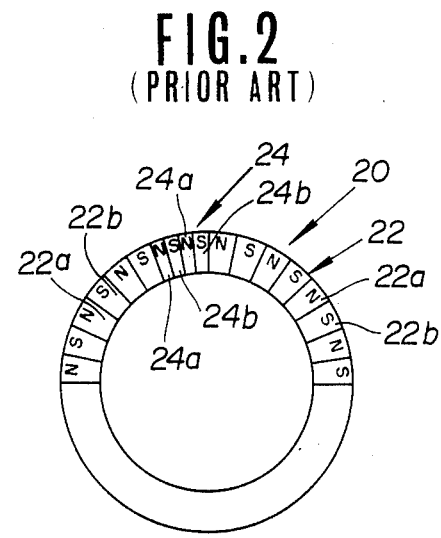
FIG. 2 shows a magnetic ring serving as a rotatable component of a conventional rotation sensor.
Figure 3:
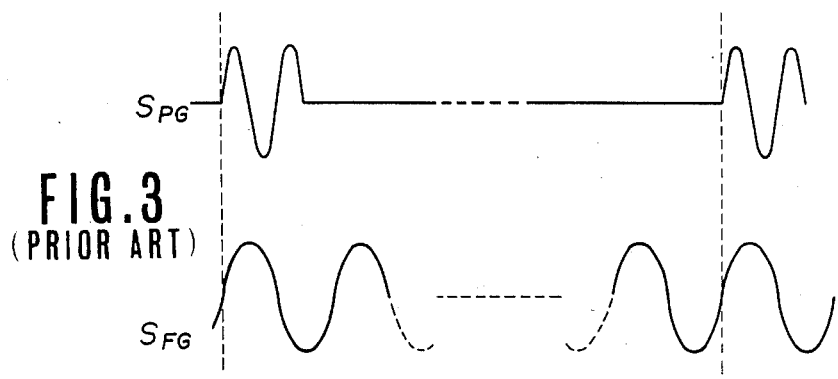
FIG. 3 illustrates the waveforms of the position signal PG and the reference signal FG produced by the conventional rotation sensor of FIGS. 1 and 2.
Figure 4:
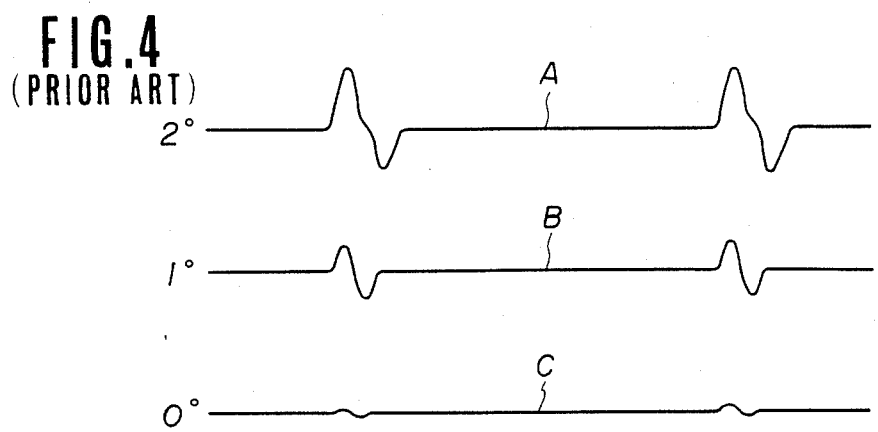
FIG. 4 shows noise components in the FG carrier due to the influence of the PG magnetic blocks of the rotatable component on the FG detector at various phase shifts of the PG detector relative to the FG detector.
Figure 11:
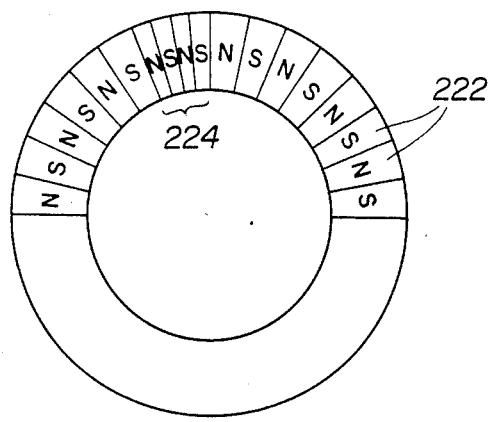
FIGS. 11 to 14 show various arrangements of magnetic blocks on the rotatable component designed for use with the stationary components shown in FIGS. 9 and 10.
Figure 12:
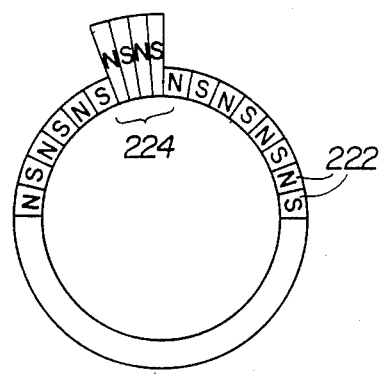
Figure 14:
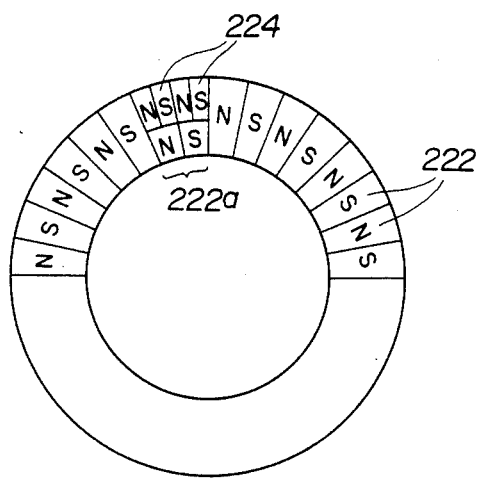
Figure 13:
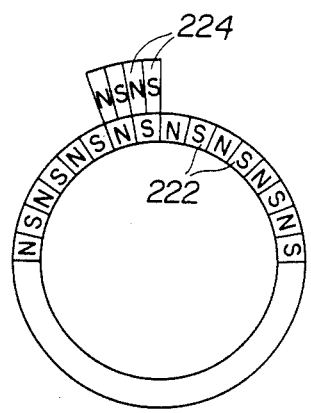

The printed circuit board 210 with the printed FG and PG detectors 212 and 214 may be used in conjunction with any of the embodiments of a magnetic ring 220 illustrated in FIGS. 11-14. FIGS. 11-14 show the magnetization patterns on the periphery of each magnetic ring 220, as was done in connection with FIG. 2. In the embodiment of FIG. 11, the radial dimension of all of the FG and PG magnetic blocks 222 and 224 are expanded so that each magnetic block will overlap both the FG and PG detectors 212 and 214 despite their radial offset. In the magnetization pattern of FIG. 12, the FG magnetic blocks 222 have the same radial dimension as in FIG. 2 so that they will overlap only the FG detector 212. The PG magnetic blocks 224 of FIG. 12 are extended radially so as to overlap both the FG detector 212 and PG detector 214. In the magnetization pattern in FIG. 13, the FG blocks 222 have the same radial dimension as in FIGS. 2 and 12. In this embodiment, FG magnetic blocks 222 are formed about the entire circumference of the magnetic ring 220. The PG magnetic blocks 224 are radially offset outside of the ring of FG magnetic blocks 222. Therefore, the PG detecting magnetic blocks 224 overlap only the PG detector 214. In the magnetization pattern of FIG. 14, the radial dimension of the FG magnetic blocks 222 is generally expanded to cover the radial extent of both the FG and PG detectors 212 and 214. At the angular position of the PG magnetic blocks 224, however, the radial dimension of the FG detecting magnetic blocks 222a is reduced so as to overlap only the FG detector 212. The PG magnetic blocks 224 are radially positioned and dimensioned so to overlap only the PG detector 214 and to fill in the gap in the magnetic ring 220 left by the shortened FG blocks 222a. The outer circumference of the PG magnetic blocks 224 of FIG. 9D lies flush with that of the normal FG magnetic blocks 222.

These arrangements significantly reduce interference between the PG and FG detectors. However, some slight mutual interference between the PG detector and the FG detector may still occur. It has been found that this interference is picked up by the connecting line 212e and the common line 218 which cross the magnetic flux lines generated in the radial region r by the PG magnetic blocks 224 in all of the arrangements shown in FIGS. 11-14 as the magnetic ring 220 rotates with the magnetic rotor 43 of the brushless motor 40. Therefore, in order to prevent interference between the PG magnetic blocks and the FG detector the influence of the magnetic flux of the PG magnetic blocks on the connector line 212e and the common line 218 must be cancelled.

FIG. 10 shows a printed circuit pattern for the FG and PG detectors 212 and 214, featuring a connector line 212f and a common line 218a, of the preferred embodiment of the rotation sensor according to the present invention. In the preferred embodiment of FIG. 10, the connecting line 212f and the common line 218a are connected to opposite ends of the FG detector 212, which are actually adjacent but unconnected detector elements 212a located approximately 180° away from the PG detector 214. The radii of the connector line 212f and the common line 218a are selected so that the tangent at each point along the lines 212f and 218a lies approximately parallel to the orientation of the magnetic flux generated between the nearest pair of adjacent FG magnetic blocks 222. In general, the induced electric field intensity E can be calculated by the following formula:

$$E = V \times B \times \sin \theta$$

where
V is relative angular velocity between the printed circuit board and the magnetic ring;
B is magnetic flux density; and
$\theta$ is an angle subtended by the tangent to the connector and common lines and the orientation of the magnetic flux.

As can be appreciated from the above formula, by reducing the angle $\theta$ to zero, the induced electric field E can be successfully reduced to zero. In addition, with the printed circuit pattern shown in FIG. 10, since each of the lines 212f and 218a always crosses a plurality of magnetic flux zones of alternating polarity generated by numerous pairs of adjacent FG magnetic blocks, cancellation effect on the induced electric field helps to reduce the overall influence of the PG magnetic blocks 224 on the FG detector output.

Figure 15:
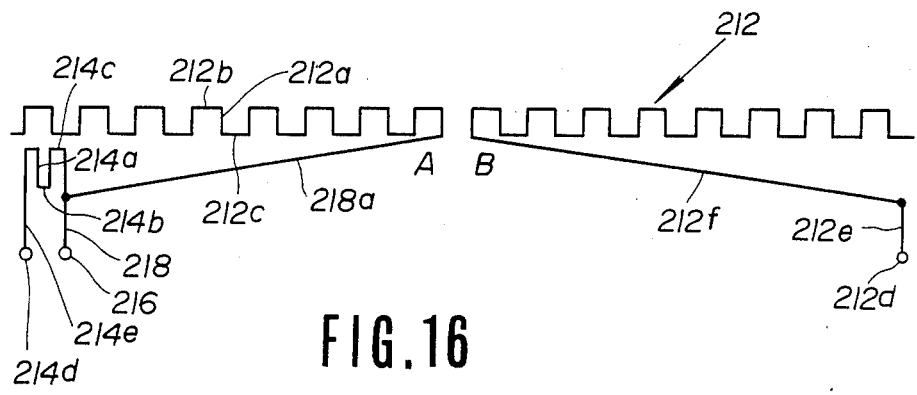
FIG. 15 is a projection of the printed circuit of FIG. 10.

FIG. 15 is a projection of the printed circuit pattern of FG and PG detectors 212 and 214 of FIG. 10 along a linear axis. As can be appreciated herefrom, the connector line 212f and the common line 218a extend in straight lines (in the projection) from the FG detector elements 212a to the terminals 212d and 216. The clearance between the FG detector elements 212a and the lines 212f and 218a near the connections A and B can be adjusted, in particular expanded, so as to provide adequate electrical clearance therebetween. In this case, the curvature of the lines 212f and 218a will be slightly modified to allow adjustment of the separation between the lines and the FG detector elements.

Figure 16:
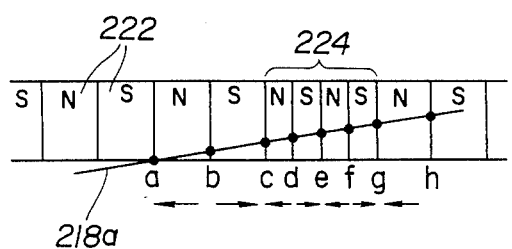
FIG. 16 is a diagram of the influences of the magnetic flux generated by the magnetic blocks of the rotatable component.

The electric fields induced in the lines 218a and 212f by adjacent magnetized zones are of opposite polarity, as shown in FIG. 16. As a result, the electric fields induced by adjacent zones interfere with each other. For instance, referring to the arrows in FIG. 16, which each represent the polarity of the electric field induced by the corresponding magnetized zone, assuming positive voltage is induced by the zone between points a and b of the common or FG connector line, negative voltage is induced by the zone between the points b and c. Similarly, for each of the zones between points c and d, d and e, e and f, f and g, and g and h, the voltages induced by adjacent zones will be of opposite polarity. Therefore, the total induced voltage will be of a much lower order of magnitude than in conventional systems or even in the circuit shown in FIG. 9.

Figures 17, 18:
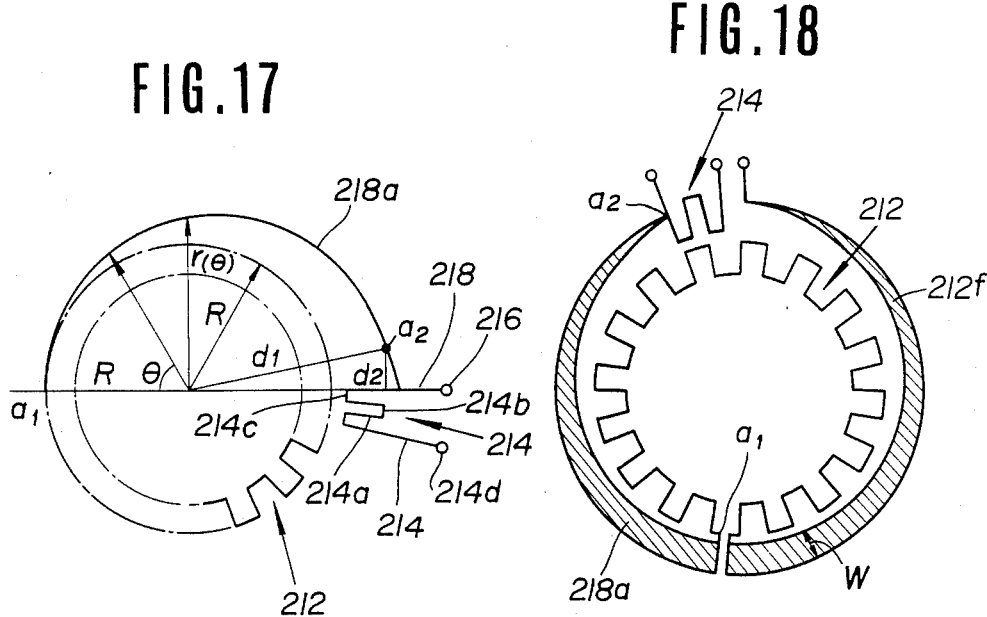
FIG. 17 is a diagram illustrating one way to plot the curved conductor connecting the PG detector to its output terminal.
FIG. 18 shows a modified form of the printed circuit of FIG. 10.

In order to plot the curvature of the FG connector line and the common line, a formula can be derived by assuming the following, with reference to FIG. 17:

Angle $\theta$ is the angular separation from a reference line defined by a point $a_1$, diametrically opposing the common terminal, and the center O of the circle defined by the FG detector, the distance $r(\theta)$ is the distance between the center O and the conductor 218a; at $a_1$, the angle $\theta$ is 0 and $r(\theta)$ equals the external diameter R of the FG detector;

At the opposite end $a_2$ of the curve, the distance $r(\theta)$ is $d_1$ and angle $\theta = 180 - \sin^{-1}(d_2/d_1)$ where $d_2$ is the distance from the point $a_2$ to the reference line. Then, assuming $\theta$ and $r(\theta)$ are directly proportional, $$r(\theta) = R + \frac{\theta(d_1 - R)}{180 - \sin^{-1}(d_2/d_1)}.$$

FIG. 18 shows another embodiment of the printed circuit pattern for the FG and PG detectors 212 and 214 with a modified connector line 212f and a modified common line 218a. The connector line 212f and the common line 218a each have a radial width w corresponding to the radial width of the PG magnetic blocks 224 in the area of point $a_i$. The radial width w of each of the connector line 212f and the common line 218a gradually decreases to a minimal width dw at the point $a_2$. The rate of decrease may be constant. The inner curve of the connector line 212f and the common line 218a is essentially the same curve illustrated with respect to the embodiment of FIG. 10.

With this printed circuit pattern, the connector lines 212f and 218a cross the magnetic flux lines generated between adjacent FG magnetic blocks in the same manner as described with respect to FIGS. 10. Thus, mutual interference between the induced electric fields will tend to cancel in the similar manner as discussed with respect to FIG. 16. Therefore, total value of the electric fields induced in the connector line 212f and 218a will be held to near zero.

Although the printed circuit patterns according to the present invention have been disclosed in terms of specific preferred embodiments of the invention, the invention should not be understood as being limited to the specific embodiments set forth above, but should be recognized as being capable of being embodied in any many ways within the scope of the invention.

For example, although the point $a_1$ of the connector line and common line is located approximately diametrically opposite the PG detector, the point $a_1$ can be shifted to either side. For instance, if so desired, the point $a_1$ can be shifted about 90° about the center of the FG detector. In another possible modification, the connector line and common line can extend next to each other along one side. For example, the connector line 212f of FIG. 10 can be shifted to the opposite side so as to lie next to and essentially parallel to the common line 218a. In this case, the FG output terminal 212d may be shifted to the other side of the common terminal. Furthermore, it would also be possible to shift the points $a_1$ of both of the connector line and the common line about 90° so that the connector line and common line extend over about half of the circumference of the FG detector. In this case, although the FG output level may be reduced, it would be possible to satisfactorily prevent interference between the PG detector and the FG carrier frequency. Furthermore, it would be also possible to produce a plurality of reference position indicative signals (PG) during one cycle of rotation of the rotary component, such as the rotary drum of the VTR head. In such case, a number of groups of PG detecting magnetic blocks may be disposed at predetermined angular positions. Alternatively, a plurality of PG detectors may be disposed at predetermined angular positions.

The rotation sensor thus constructed will be essentially free of interference between the PG magnetic blocks and the FG carrier frequency thus ensuring the accuracy of the position and reference signals. This rotation sensor may be used to advantage in VTR head servo systems and so forth. In cases where the rotation sensor is employed in VTR servo systems, the position signals and reference signals can be used in well-known ways. Phase and speed control for VTR heads is discussed in detail in U.S. Pat. No. 4,322,757, issued to A. Hatakeyama, on Mar. 30, 1982, for example. The rotation sensor according to the present invention eliminates fluctuations in the carrier frequency of the position signals, ensuring accurate control of the rotation of the rotary drum and the magnetic head elements so as to provide high-quality, jitter-free VTR play-back.

Thus, the present invention fulfills all of the objects and advantages sought therefor.

What is claimed is:

1. A rotation sensor comprising:
a first rotary component including a magnetic element having a plurality of first segments arranged about the periphery of said rotary component and generating magnetic fields between each adjacent pair of first segments, and one or more second segments disposed near said first segments and representing a reference angular position of a rotating object, said magnetic element being coupled with said rotating object, the angular motion of which is to be monitored, for rotation therewith; and
a second stationary component on which a first signal generator is cooperative with said first segments of said magnetic element to output a first signal representative of angular motion speed of said rotating object, and a second signal generator is cooperative with said second segments of said magnetic element to output a second signal indicative of the presence of said rotating component in said reference position, said first signal generator being connected to its output terminals via communication lines lying on the same plane, on which said first signal generator is arranged, said communication lines extending across the magnetic field formed by said second segments of said magnetic element and arranged to avoid electromagnetic interaction with said magnetic field formed by said second segments.

2. The rotation sensor as set forth in claim 1, wherein said first signal generator has a circular outer periphery and the outer periphery of said second signal generator is concentric with the outer periphery of said first signal generator, and said communication lines lie oblique to the radii of said second signal generator.

3. The rotation sensor as set forth in claim 2, wherein adjoining first segments of said magnetic element of said rotary component are of opposite polarity, said first segments are distributed radially symmetrically about the axis of rotation of said rotary component, the polarity of said second segments alternate among themselves and with adjoining first segments, and said second segments are regularly spaced angularly at a smaller spacing than said first segments.

4. The rotation sensor as set forth in claim 3, wherein said first signal generator comprises a plurality of radially extending elements radially synmetrically arranged at a pitch corresponding to the angular spacing of said first segments of said magnetic element, and said second signal generator comprises a plurality of elements extending radially at a pitch corresponding to the angular spacing of said second segments.

5. The rotation sensor as set forth in claim 4, wherein opposite ends of each of said plurality of elements of said first and second signal generators are connected to different adjacent elements via conductive elements to form first and second integral conductive lines respectively.

6. The rotation sensor as set forth in claim 4, wherein the pitch of said elements of said second signal generator is half of the pitch of said elements of said first signal generator.

7. The rotation sensor as set forth in claim 6, wherein the phase of spacing of said elements of said second signal generator is shifted by a predetermined angle with respect to the phase of said first signal generator.

8. The rotation sensor as set forth in claim 7, wherein opposite ends of each of said plurality of elements of said first and second signal generators are connected to different adjacent elements via conductive elements to form first and second integral conductive lines respectively.

9. The rotation sensor as set forth in claim 8, wherein said communication lines have the same angular extent and shape but curve in opposite directions, and the distance r between said communication lines and the center of the first signal generator is represented by the formula:

$$r(\theta) = R + \frac{\theta(d_1 - R)}{\phi}$$

where $\theta$ is an angle with respect to a reference line defined by the point of connection of the first signal generator and the communication line, and the center the first signal generator; R is the distance between the point of connection between said communication line and said first signal generator and the center of the first signal generator; $d_1$ is the distance between the center and the point of connection of the communication line and an output terminal; and $\phi$ is the angular position ($\theta$) of the point of connection between the communication line and the output terminal.

10. The rotation sensor as set forth in claim 7, wherein said second signal generator is radially offset from said first signal generator.

11. The rotation sensor as set forth in claim 10, wherein said first segments radially overlap only said first signal generator and said second segments radially overlap both said first and second signal generators.

12. The rotation sensor as set forth in claim 10, wherein said first and second segments have the same radial extent and overlap both of said first and second signal generators.

13. The rotation sensor as set forth in claim 10, wherein said first segments comprises longer segments with a radial dimension sufficient to overlap both of said first and second signal generators and shorter segments which radially overlap only said first signal generator, said shorter segments of said first segments being disposed at said reference position, and said second segments radially overlap only said second signal generator and radially adjoin said shorter segments of said first segments.

14. The rotation sensor as set forth in claim 13, wherein said communication lines have the same angular extent and shape but curve in opposite directions, and the distance r between said communication lines and the center of the first signal generator is represented by the formula:

$$r(\theta) = R + \frac{\theta(d_1 - R)}{\phi}$$

where $\theta$ is an angle with respect to a reference line defined by the point of connection of the first signal generator and the communication line, and the center the first signal generator; R is the distance between the point of connection between said communication line and said first signal generator and the center of the first signal generator; $d_1$ is the distance between the center and the point of connection of the communication line and an output terminal; and $\phi$ is the angular position ($\theta$) of the point of connection between the communication line and the output terminal.

15. The rotation sensor as set forth in claim 14, wherein said stationary component further comprises an electrically conductive disc on which said first and second generators are printed over an insulating layer, said conductive disc limiting the extent of magnetic fields.

16. A rotation sensor for sensing angular speed and angular position of a rotating object, including a rotary magnet rotatable with said rotating object and a stationary printed circuit board opposing said rotary magnet, characterised in that said rotary magnet is provided with a plurality of symmetrically arranged, angularly-spaced first sectors magnetized to alternating polarities, and a plurality of second sectors of alternating polarity arranged on said rotary magnet at a reference position and having a different angular spacing than said first sectors; and said printed circuit board has a plurality of velocity sensing conductors radially symmetrically arranged at a pitch corresponding to the angular spacing of the first sectors, a plurality of regularly angularly spaced reference position detecting conductors at a position corresponding to said reference position of said rotating object and radially offset from the angular velocity sensing conductors with a different angular spacing than said velocity sensing conductors, said velocity sensing conductors all being connected in series to form an integral line connected to signal output lines at both ends thereof, said signal outputting lines lying on the same plane with said velocity sensing conductors for connecting the latter to an output terminal and extending oblique to the radial direction of said velocity sensing conductors so as to avoid interaction with the magnetic field formed by said second sectors of said rotary magnet.

17. The rotation sensor as set forth in claim 16, wherein the angular spacing of said reference position detecting conductors is half of the angular spacing of said velocity sensing conductors.

18. The rotation sensor as set forth in claim 17, wherein phase of said reference position detecting conductors is shifted with respect to said velocity sensing conductors by a predetermined angle.

19. The rotation sensor as set forth in claim 18, wherein said first sectors radially overlap only said velocity sensing conductors and said second sectors radially overlap both said velocity sensing conductors and said reference position detecting conductors.

20. The rotation sensor as set forth in claim 18, wherein said first sectors and said second sectors have the same radial dimension and to overlap both of said velocity sensing conductors and said reference position detecting conductors.

21. The rotation sensor as set forth in claim 18, wherein first sectors comprises longer sectors with a radial dimension sufficient to overlap both of said velocity sensing conductors and said reference position detecting conductors and shorter sectors which radially overlap only said velocity sensing conductors, said shorter sectors of said first sectors being disposed at said reference position, and said second sectors radially overlapping only said reference position detecting conductors and radially adjoining said shorter sectors.

22. The rotation sensor as set forth in claim 21, wherein said communication lines have the same angular extent and shape but curve in opposite directions, and the distance r between said communication lines and the center of the first signal generator is represented by the formula:

$$r(\theta) = R + \frac{\theta(d_1 - R)}{\phi}$$

where $\theta$ is an angle with respect to a reference line defined by the point of connection of the first signal generator and the communication line, and the center the first signal generator; R is the distance between the point of connection between said communication line and said first signal generator and the center of the first signal generator; $d_1$ is the distance between the center and the point of connection of the communication line and an output terminal; and $\phi$ is the angular position ($\theta$) of the point of connection between the communication line and the output terminal.

23. The rotation sensor as set forth in claim 22, wherein said printed board further comprises an electrically conductive disc on which said velocity sensing conductors and said reference position detecting conductors are printed over an insulating layer.

24. A magnetic rotary head assembly for a video tape recorder including a rotary drum to which a magnetic head is secured and a stationary drum forming a tape guide drum in conjunction with said rotary drum, a brushless motor for driving said rotary drum, and a rotation sensor with comprises:

a first rotary component including a magnetic element having a plurality of first segments arranged about the periphery of said rotary component and generating magnetic fields between each adjacent pair of first segments, and one or more second segments disposed near said first segments and representing a reference angular position of said rotating object, said magnetic element being coupled with a rotating object, the angular motion of which is to be monitored, for rotation therewith; and a second stationary component on which a first signal generator is cooperative with said first segments of said magnetic element to output a first signal representative of angular motion speed of said rotating object, and a second signal generator is cooperative with said second segments of said magnetic element to output a second signal indicative of the presence of said rotating component in said reference position, said first signal indicative of the presence of said rotating component in said reference position, said first signal generator being connected to its output terminals via communication lines lying on the same plane, on which said first signal generator is arranged, said communication lines extending across the magnetic field formed by said second segments of said magnetic element and arranged to avoid electromagnetic interaction with said magnetic field formed by said second segments.

25. A magnetic rotary head assembly for a video tape recorder including a rotary drum to which a magnetic head chip is secured and a stationary drum forming a tape guide drum in conjunction with said rotary drum, a brushless motor for driving said rotary drum, and a rotation sensor which comprises:

rotary magnet rotatable with said rotating object and a stationary printed circuit board opposing said rotary magnet, characterized in that said rotary magnet is provided with a plurality of second sectors of alternating polarity arranged on said rotary magnet at a reference position and having a different angular spacing than said first sectors, said printed circuit board has a plurality of velocity sensing conductors radially symmetrically arranged at a pitch corresponding to the angular spacing of the first sectors, a plurality of regularly angularly spaced reference position detecting conductors at a position corresponding to said reference position of said rotating object and radially offset from the angular velocity sensing conductors with a different angular spacing than said velocity sensing conductors, said velocity sensing conductors all being connected in series to form an integral line connected to signal output lines at both ends thereof, and said signal outputting lines lying on the same plane with a velocity sensing conductor for connecting the latter to an output terminal and extending oblique to the radii of said velocity sensing conductors so as to avoid interaction with the magnetic field formed by said second sectors of said rotary magnet.

26. A rotation sensor comprising:

a magnetic element having a number of first symmetrical circular sectors, adjoining first sectors being magnetized in opposite polarities, and a smaller number of second circular sectors magnetized alternatingly in opposite polarities, the angular width of said first sectors being an integral product of the angular width of said second sectors;

an FG detector for producing a reference signal with a frequency proportional to angular velocity and having a number of conductors connected in series between a first terminal and an FG output terminal and susceptible to electromagnetic induction by said first sectors;

a PG detector for producing a position signal and having a number of conductors connected in series between said first terminal and a PG output terminal in parallel with said FG detector and susceptible to electromagnetic induction by said second sectors;

signal lines including a first signal line connecting said FG detector to said first terminal and a second line connecting said FG detector to said FG output terminal, said signal lines extending across the magnetic field formed by said second circular sectors in a direction oblique to the direction of the magnetic flux of said magnetic field; and said magnetic element being secured to a rotatable body opposite said detectors.

27. A rotation sensor comprising magnetic means defining a plurality of magnetic poles arranged in a ring and divided into a first set of said poles and a second set of at least one pole, said first set of said poles being distributed around said ring with alternating polarities, a detector comprising a first conductor and a second conductor, means mounting said magnetic means for rotation relative to said detector, said first conductor having at least one segment located in a first annulus adjacent to the poles of said first set, said second conductor having at least one segment located in a second annulus defined between circular boundaries adjacent to said first annulus and to the pole of said second set, said first conductor and the poles of said first set comprising first means to generate a signal representing the speed of rotation of said magnetic means relative to said detector, said second conductor and the pole of said second set comprising second means to produce a reference position indicative signal each time said magnetic means rotates through a predetermined angular position relative to said detector, said first conductor having an output line connected to said segment of said first conductor and radially extending on the same plane to said detector and in a region where a magnetic field is formed by said poles of said second set of magnetic means, said output line being directed in a direction with respect to said second annulus at an angle oblique to the circular boundaries of said second annulus.

28. A rotation sensor as recited in claim 27, wherein said first conductor and said second conductor are connected in parallel to a common output terminal, said first conductor being connected to said output terminal through said output line.

29. A rotation sensor as recited in claim 27, wherein said first conductor comprises a series connection of a plurality of segments distributed along said first annulus perpendicular to the flux produced by the poles of said first set, wherein said first conductor is connected through said output line to a common output terminal in parallel with said second conductor, said output line extending from said output terminal to one end of said series connection at an angular position on the opposite side of said first annulus from said output terminal.

30. A rotation sensor as recited in claim 29, wherein said first conductor further comprises a second output line connected between a second end of said series connection and a second output terminal and extending across said second annulus at an angle oblique to the circular boundaries of said second annulus, said second output terminal being located adjacent to said common output terminal, said second end of said series connection being located adjacent to said first end of said series connection.

31. A rotation sensor as recited in claim 27, wherein said output line tapers in width between edges thereof within said second annulus with one of said edges of said output line being circular and coextensive with one of said circular boundaries of said second annulus, and the other of the edges of said output line extending obliquely across said second annulus.

32. A rotation sensor as recited in claim 27, wherein said output line extends across said second annulus through an angle of said annulus which is a multiple of the angle occupied by the pole of said second set.

33. A rotation sensor as recited in claim 32, wherein said second set comprises an even number of said poles positioned adjacent to each other and angularly distributed along said ring with alternating polarities adjacent to said second annulus.

34. A rotation sensor as recited in claim 27, wherein said output line extends across said annulus from an angular position on one side of said annulus to an angular position on the opposite on one side of said annulus.

35. A rotation sensor as recited in claim 27, wherein the poles of said first set are distributed at equal angular intervals along said ring, and said second set comprises a plurality of poles distributed along said ring at angular intervals which are one-half the angular intervals of said first set, said first conductor comprising a plurality of radial segments connected in series and distributed around said first annulus at angular intervals equal to the angular intervals of said first set of Poles, said second conductor comprising a plurality of radial segments distributed along said second annulus at angular intervals equal to the angular intervals of the poles of said second set, the radial segments of said second conductor being angularly offset from the radial segments of said first conductor.

36. A rotary sensor as recited in claim 35, wherein said angular offset is up to two degrees.

37. A rotary sensor as recited in claim 35, wherein the number of radial segments of said second conductor is four.

38. A rotary sensor as recited in claim 37, wherein the number of poles in said second set is four.

39. A rotary sensor as recited in claim 35, wherein the number of radial segments of said first conductor is four.

* * * * *